United States Patent Office 3,840,602
Patented Oct. 8, 1974

3,840,602
OXIDATION OF UNSATURATED HYDROCARBONS TO ALDEHYDES
Colin Christopher McCain, Horley, and Eric Andrew Porter, Sutton, England, assignors to BP Chemicals International Limited, London, England
No Drawing. Filed July 10, 1972, Ser. No. 270,204
Claims priority, application Great Britain, July 13, 1971, 32,799/71
Int. Cl. C07d 45/04
U.S. Cl. 260—604 R    12 Claims

ABSTRACT OF THE DISCLOSURE

Unsaturated hydrocarbons containing at least 3 carbon atoms in the vapour phase over a catalyst composition comprising elemental silver and a Group VIII metal or a compound thereof.

---

The present invention relates to the production of unsaturated aldehydes by the oxidation of unsaturated hydrocarbons.

Processes for the oxidation of unsaturated hydrocarbons in the vapour phase by means of oxygen-containing gases in the presence or absence of catalysts are well known, but have not proved entirely satisfactory due primarily to the necessity of the use of high reaction temperatures and the consequent over-oxidation of the desired intermediate products.

According to the present invention a process for the production of unsaturated aldehydes comprises oxidising unsaturated hydrocarbons containing at least 3 carbon atoms in the molecule by passing the said hydrocarbon in admixture with oxygen or an oxygen-containing gas in the vapour phase at elevated temperatures in the presence of a catalyst comprising elemental silver and a compound of a Group VIII metal of the Periodic Classification due to Mendeleev.

The present invention is an improvement over oxidation processes used hitherto for the following reasons: The high activity of the catalyst means that a low reaction temperature may be used; this lessens the heat removal problem since water or organic liquids may be used as the heat transfer medium instead of the customary molten salts. It provides in the oxidation of an unsaturated hydrocarbon such as propylene an acrolein product at high yield with a minimum of by-products. The high selectivity to acrolein lessens the problem of heat removal from the reactor since it is the reactions producing carbon oxides which generate the greatest heat of reaction.

Suitable examples of the unsaturated hydrocarbons which may be oxidised according to the process of the present invention are unsaturated aliphatic hydrocarbons containing up to 8 carbon atoms. Hydrocarbons such as propylene, n-butene and isobutene are preferred.

The process according to the present invention may conveniently be carried out by passing a gaseous mixture of the olefins and a molecular oxygen containing gas, at an elevated temperature over a bed of supported or unsupported catalyst which may be in the form of discs or pellets.

The concentration of the hydrocarbon in the gaseous mixture may vary within moderately wide limits, for example, between 2 and 20% or between 60 and 80% by volume, but care must be taken to avoid the formation of explosive mixtures.

The gaseous reaction mixture may also contain an inert gaseous diluent, e.g. helium or nitrogen and, in the latter instance, the molecular oxygen containing gas may be conveniently supplied as air. The concentration of the inert gaseous diluent in the gaseous mixture may vary within the range of 0 to 97%.

The reaction temperature may be in the range of 100° to 400° C. preferably from 180° to 300° C. The process may also be carried out under pressures ranging from atmospheric to about 20 atmospheres gauge.

The contact time may be, for example, in the range of 0.1 to 60 seconds and preferably about 2 to 40 seconds.

By "Group VIII metal" is meant throughout the specification any of the metals selected from the group ruthenium, rhodium, palladium, osmium, iridium, and platinum. The Group VIII metal compound in the catalyst composition of the present invention is suitably a halide, preferably a chloride or a bromide. Rhodium and iridium halides, particularly the trichlorides and tribromides are most preferred. The amount of Group VIII metal in the catalyst composition should preferably be less than 50% by weight, most preferably below 20% by weight based on the total weight of the silver and Group VIII metal compound.

The elemental silver present in the catalyst composition may be prepared by any conventionally known method, for example by precipitation of silver oxide from a solution of a suitable silver salt such as silver nitrate, followed by reduction of the oxide with a suitable reducing agent such as glucose or dextrose to produce metallic silver powder. The catalyst composition itself is then produced by preparing a slurry of metallic silver powder in a solution of the Group VIII metal compound, allowing this solution to stand for a suitable length of time and thereafter separating the precipitate by filtration. The precipitate is then washed, dried and pressed into pellets or discs as required. If desired the catalyst may be deposited on a suitable support, e.g. alumina or silica.

It has proved beneficial in maintaining high catalyst activity for long periods to introduce in the feed gas low concentrations of volatile organic chloro-compounds, e.g. 0.1–0.3% of 1,2-dichloroethane, based on the total gas feed.

The invention is further illustrated with reference to the following examples.

Example 1

A silver catalyst modified with rhodium trichloride was prepared. 213 g. of silver nitrate and 27 g. of dextrose were dissolved in 2700 ml. of water. 150 g. of potassium hydroxide were dissolved in 150 ml. of water and added dropwise to the silver nitrate solution. The reduction of the precipitated silver oxide was completed by stirring for 45 minutes at room temperature and then heating to 70°–75° C. during the course of a further 45 minutes. The silver powder formed was filtered and washed with cold water until the washings were neutral to phenol phthalein indicator.

5 g. of rhodium trichloride ($RhCl_3.3H_2O$) were dissolved in 50 ml. of water. This solution was added dropwise to the precipitated silver which was stirred as a slurry in 120 ml. of water. After standing for two days, the precipitate was filtered, washed with a small volume of water and oven-dried at 120° C.

The catalyst was powdered to pass through a B.S.S. 60 mesh and pressed into 1⅜" diameter discs using a ring press operating at 3 tons. The discs were subsequently broken down and the particles screened to a range of B.S.S. 5 to 8 mesh.

A glass helical tube with a 6 mm. was used for the reactor. The helix had 14 turns covering a distance of 20 cm. and an outside diameter of 4 cm. A 28 ml. portion of the silver/rhodium trichloride catalyst was inserted into the reactor.

The catalyst was tested for the oxidation of propylene using a feed composition of argon:oxygen:propylene of 83.0:14.4:2.6 at a temperature of 223° C. and a contact time of 4.2 seconds. The catalyst was found to be initially unselective giving oxidation to carbon dioxide, but as the time on stream increased the reaction became increasingly selective to the formation of acrolein. After 24 hours the yield of acrolein on propylene fed was 66.6% for a propylene conversion of 90.6%.

Other tests for the oxidation of propylene at different reaction temperatures and feed conditions gave the following results (see Table 1).

TABLE 1

| Reaction temperature, ° C. | Contact time, sec. | Feed composition, percent vol./vol. | | | Percent propylene converted | Percent yield of acrolein on propylene fed |
|---|---|---|---|---|---|---|
| | | Argon | Oxygen | Propylene | | |
| 225 | 4.1 | 83.1 | 14.1 | 2.5 | 88.2 | 70.0 |
| 225 | 4.2 | 79.9 | 13.0 | 7.1 | 47.6 | 40.3 |
| 243 | 4.2 | 79.9 | 13.1 | 7.0 | 78.7 | 69.7 |
| 253 | 4.2 | 79.9 | 13.0 | 7.1 | 89.7 | 76.6 |

Example 2

The catalyst was tested for the oxidation of isobutene. Methacrolein and carbon dioxide were the major reaction products. Results of tests are given in Table 2 below.

TABLE 2

| Reaction temperature, ° C. | Contact time, sec. | Feed composition, percent vol./vol. | | | Percent isobutene converted | Percent yield of methacrolein on isobutene fed |
|---|---|---|---|---|---|---|
| | | Argon | Oxygen | Isobutene | | |
| 250 | 8.1 | 87.5 | 10.2 | 2.3 | 69 | 32 |
| 258 | 8.1 | 87.5 | 10.2 | 2.3 | 82 | 37 |
| 263 | 8.1 | 87.5 | 10.2 | 2.3 | 93 | 53 |

Example 3

A supported silver catalyst modified with rhodium trichloride was prepared.

21.3 g. of silver nitrate and 2.7 g. of dextrose were dissolved in 270 ml. of water. 15 g. of potassium hydroxide were dissolved in 15 ml. of water and added dropwise to the silver nitrate solution over a period of 40 minutes. The reduction of the precipitated silver oxide was completed by stirring for 80 minutes at room temperature and then heating to 70–80° C. and holding at this temperature for 40 minutes. The silver precipitate was filtered and washed with cold water until the washings were neutral to phenol phthalein indicator.

0.5 g. of rhodium trichloride ($RhCl_3.3H_2O$) was dissolved in 8 ml. of water. This solution was added dropwise to the precipitated silver which was slurried in a minimum volume of water sufficient to enable thorough stirring. The slurry was stirred for 2 hours, allowed to stand overnight and stirred for a further 3½ hours. The supernatant liquor was decanted leaving a damp silver-rhodium slurry.

50 g. of Alundum (Registered Trade Mark) 8–16 mesh, were added, a little at a time, to the wet $Ag/RhCl_3$ slurry. The Alundum absorbed the $Ag/RhCl_3$. The supernatant liquor was decanted, reduced in volume by evaporation and added to the Alundum/$Ag/RhCl_3$ mixture with careful stirring. The residual water was removed by evaporation and the supported catalyst oven-dried at 120° C. for 16 hours.

The catalyst was tested for the oxidation of propylene using a feed composition of argon:oxygen:propylene of 79.3:13.4:7.3 at a temperature of 239° C. and a contact time of 4.1 seconds. The catalyst was initially unselective giving carbon dioxide but with time on stream became increasingly selective for the formation of acrolein. After 7 hours the yield of acrolein on propylene fed was 13.7% for a propylene conversion of 16.9%.

Other tests for the oxidation of propylene at different reaction temperatures gave the following results. (See Table 3.)

TABLE 3

| Reaction temperature, ° C. | Contact time, sec. | Feed composition, percent vol./vol. | | | Percent propylene converted | Percent yield of acrolein on propylene fed |
|---|---|---|---|---|---|---|
| | | Argon | Oxygen | Propylene | | |
| 251 | 8.0 | 79.8 | 13.2 | 7.0 | 37.0 | 28.3 |
| 260 | 8.0 | 79.8 | 13.2 | 7.0 | 43.3 | 35.1 |
| 272 | 8.1 | 79.8 | 13.2 | 7.0 | 54.0 | 43.7 |

Example 4

A silver catalyst modified with iridium trichloride was prepared.

The silver used in this preparation was precipitated as described in Example 1. A solution containing 1 g. of hydrated iridium trichloride dissolved in 60 ml. of water was added dropwise to a stirred slurry of 66 g. of precipitated silver in 50 ml. of distilled water. The mixture was stirred for 1 hour, slowly evaporated to dryness and oven-dried at 120° C.

The catalyst was powdered to pass B.S.S. 60 mesh and pressed into 1⅜″ diameter discs using a ring press operating at 3 tons. The discs were subsequently broken down and the particles screened to a range of B.S.S. 5 to 16.

The catalyst was tested for the oxidation of propylene. The catalyst became increasingly selective to the formation of acrolein with time on stream. Using a feed composition of argon:oxygen:propylene: of 83.5:13.6:2.9 and a contact time of 7.6 seconds the yield of acrolein on propylene fed was 25.5% for a propylene conversion of 39.2% at 250° C.

Example 5

A second silver catalyst modified with iridium trichloride was prepared as described in Example 4 above.

3.007 g. of hydrated iridium trichloride dissolved in 40 ml. of water were added dropwise to 65.1 g. as precipitated silver stirred as a slurry in 100 ml. of water. The mixture was allowed to stand for 16 hours, slowly evaporated and oven-dried at 110° C. The catalyst was pressed into discs as described above.

The catalyst on test with a feed composition argon:oxygen:propylene of 83.2:14.2:2.6 and a contact time of 7.9 seconds gave a 28.3% yield of acrolein at a propylene conversion of 50.2%.

Example 6

The silver/iridium chloride catalyst described in Example 5 was tested for the oxidation of isobutene and found to give methacrolein.

Using a feed composition of argon:oxygen:isobutene of 87.5:10.1:2.4 and a contact time of 8.2 seconds the yield of methacrolein was 18.7% for an isobutene conversion of 27% at 261° C.

Example 7

A silver catalyst modified with rhodium tribromide was prepared.

3.9 g. of rhodium trichloride (Rh content of $RhBr_3xH_2O=24\%$) were dissolved in 25 ml. of distilled water to give an intense red coloured solution. This solution was added dropwise to 70 g. of precipitated silver stirred as a slurry in 80 ml. of water. After 30 minutes the supernatant liquor was colourless. The mixture was stirred for 5 hours and the water removed on a rotary evaporation. The catalyst was dried at 120° C., screened to pass B.S.S. 60 mesh before being pressed into 1⅜″ diameter discs at 3 tons. The discs were broken down into particles with a B.S.S. mesh range of 5 to 22 for catalytic testing.

In the oxidation of propylene the catalyst became increasingly selective for the formation of acrolein with time on stream. It was found unnecessary to introduce any volatile organic chloro-compounds to the feed to maintain catalytic activity. Results of some of the tests are given in Table 4 below.

TABLE 4

| Reaction temperature, °C. | Contact time, sec. | Feed composition, percent vol./vol. | | | Percent yield of acrolein on propylene fed | Percent selectivity for acrolein |
|---|---|---|---|---|---|---|
| | | Argon | Oxygen | Propylene | | |
| 246 | 4.1 | 78.8 | 13.7 | 7.5 | 21.2 | 52 |
| 245 | 8.1 | 80.7 | 12.6 | 6.7 | 30.5 | 55 |
| 245 | 17.4 | 80.4 | 13.2 | 6.4 | 34.9 | 55 |

Example 8

The silver/rhodium tribromide catalyst prepared in Example 7 was tested for the oxidation of isobutene. Methacrolein and carbon dioxide were the major products. Results of tests are given in Table 5 below.

TABLE 5

| Reaction temperature, °C. | Contact time, sec. | Feed composition, percent vol./vol. | | | Percent isobutene converted | Percent yield of methacrolein on isobutene fed |
|---|---|---|---|---|---|---|
| | | Argon | Oxygen | Isobutene | | |
| 242 | 8.0 | 80.3 | 12.8 | 6.9 | 16 | 8.7 |
| 254 | 8.0 | 80.3 | 12.8 | 6.9 | 28 | 18.4 |
| 254 | 8.2 | 87.6 | 10.0 | 2.4 | 77 | 53.7 |

Example 9

The oxidation of butene-2 on the silver/rhodium tribromide catalyst prepared in Example 7 gave small yields of crotonaldehyde and methyl vinyl ketone. Using a feed composition of argon:oxygen:butene-2 of 79.7:13.1:7.2 and a contact time of 8.3 seconds the butene-2 conversion was 23% at 246° C. The yields of crotonaldehyde and methyl vinyl ketone were 1.3 and 2.2% respectively.

We claim:
1. A process for the production of unsaturated aldehydes which comprises reacting an olefinically unsaturated hydrocarbon containing from 3 to 8 carbon atoms with oxygen or an oxygen containing gas in the vapor phase at a temperature in the range of 100 to 400° C. in the presence of a catalyst composition essentially consisting of elemental silver and a halide of rhodium or iridium.

2. A process according to claim 1 wherein the unsaturated hydrocarbon is selected from the group propylene, n-butene and isobutene.

3. A process according to claim 1 wherein the concentration of the hydrocarbon in the gaseous mixture is between 2 and 20% or between 60 and 80% by volume.

4. A process according to claim 1 wherein the gaseous reaction mixture contains an inert gaseous diluent.

5. A process according to claim 4 wherein the inert gaseous diluent is helium or nitrogen.

6. A process according to claim 4 wherein the amount of the diluent in the gaseous mixture is in the range of 0 to 97% by volume.

7. A process according to claim 1 wherein the reaction is carried out under pressures ranging from atmospheric to 20 atmospheres gauge.

8. A process according to claim 1 wherein the contact time of the reaction is in the range of 0.1 to 60 seconds.

9. A process according to claim 1 wherein said halide in the catalyst composition is selected from the group consisting of rhodium trichloride, rhodium tribromide, iridium trichloride and iridium tribromide.

10. A process according to claim 1 wherein the catalyst is a supported catalyst.

11. A process according to claim 1 wherein propylene is converted to acrolein.

12. A process according to claim 1 wherein isobutene is converted to methacrolein.

References Cited
UNITED STATES PATENTS

| 3,565,826 | 2/1971 | Sennewald et al. | 260—604 R |
| 3,439,044 | 4/1969 | Hirsch et al. | 260—604 Ac |
| 3,300,528 | 1/1967 | Wakasa et al. | 260—604 Ac |
| 3,271,459 | 9/1966 | Brill et al. | 260—604 R |

LEON ZITVER, Primary Examiner

R. H. LILES, Assistant Examiner

U.S. Cl. X.R.

260—597 R; 252—441

UNITED STATES PATENT OFFICE
CERTIFICATE OF CORRECTION

Patent No. 3,840,602    Dated October 8, 1974

Inventor(s) COLIN CHRISTOPHER McCAIN and ERIC ANDREW PORTER

It is certified that error appears in the above-identified patent and that said Letters Patent are hereby corrected as shown below:

Col. 2, line 67, after "6 mm." insert --bore--.

Signed and sealed this 4th day of March 1975.

(SEAL)
Attest:

RUTH C. MASON
Attesting Officer

C. MARSHALL DANN
Commissioner of Patents
and Trademarks